(12) United States Patent  
Ikeda

(10) Patent No.: US 6,963,477 B2  
(45) Date of Patent: Nov. 8, 2005

(54) OVERHEAT PROTECTION CIRCUIT

(75) Inventor: Yutaka Ikeda, Yokaichi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 262 days.

(21) Appl. No.: 10/638,402

(22) Filed: Aug. 12, 2003

(65) Prior Publication Data

US 2004/0042142 A1 Mar. 4, 2004

(30) Foreign Application Priority Data

Aug. 29, 2002 (JP) .............................. 2002-250521

(51) Int. Cl.[7] .............................................. H02H 5/04
(52) U.S. Cl. ..................................................... 361/106
(58) Field of Search ........................ 361/93.8, 25, 103, 361/106

(56) References Cited

U.S. PATENT DOCUMENTS 3,728,702 A * 4/1973 Miyamoto et al. .......... 340/595

6,181,541 B1 * 1/2001 Souri et al. ................. 361/106
2002/0021539 A1 * 2/2002 Odaohhara et al. ......... 361/103

* cited by examiner

Primary Examiner—Ronald Leja  
(74) Attorney, Agent, or Firm—Keating & Bennett, LLP

(57) ABSTRACT

A semiconductor switching element performs operations of bringing a current path from a power supply to a load into conduction and interrupting the path and is controlled by an operating-mode control circuit so as to operate in a first operating mode in which a conductive operation is shifted to an interrupt operation by using a change in resistance of a first positive-temperature-coefficient thermistor when the temperature of a temperature detection portion increases and reaches a predetermined interrupt temperature, and to be in a second operating mode in which the interrupt operation is shifted to the conductive operation by using a change in resistance of a second positive-temperature-coefficient thermistor when the temperature of the temperature detection portion decreases and reaches a return temperature, which is lower than the interrupt temperature by a predetermined value. Each operating mode is controlled in the state where both positive-temperature-coefficient thermistors are thermally coupled to the temperature detection portion.

15 Claims, 8 Drawing Sheets

DISPOSED ON THE BOTTOM SIDE OF A TEMPERATURE DETECTION PORTION

DISPOSED ON THE SAME SURFACE AS A TEMPERATURE DETECTION PORTION

OVERHEAT PROTECTION CIRCUIT

BACKGROUND OF THE INVENTION

1. Field of the Invention

The present invention relates to an overheat protection circuit which is provided in a current path between a power supply and a load, for example, and is used to interrupt a current to the load by interrupting the current path when the load overheats.

2. Description of the Related Art

In DC—DC converters used as power supplies in communication base stations, for example, when the power consumption increases above the requirements, a semiconductor switching element such as an FET, power transistor, etc., which is used as a circuit element, generates excessive heat, the semiconductor switching element finally exhibits thermal runaway, and there are cases in which the semiconductor switching element does not function as a power supply.

Therefore, in an overheat protection circuit for preventing such overheating, a temperature detection element for detecting an overheating condition is required. As the temperature detection element, a temperature fuse, for example, is known. In the case of the temperature fuse, once the circuit is interrupted, the circuit does not return to its original state if left as it is, and accordingly, a new temperature fuse must be provided, which means that associated labor time and cost are needed.

On the other hand, a positive-temperature-coefficient thermistor can be used as a temperature detection element. In the case of the positive-temperature-coefficient thermistor, since the positive-temperature-coefficient thermistor can be returned to its original state after it has cut off, unlike the temperature fuse, there is no need for labor time for providing parts, and accordingly, there is an advantage in that the cost is reduced by a certain amount.

Up to now, as an overheat protection circuit using a positive-temperature-coefficient thermistor, the circuit shown in FIG. 8 has been known. This related overheat protection circuit is composed of a first series circuit having a first resistor R1, a single positive-temperature-coefficient thermistor PTC, and a second resistor R2 and a second series circuit having a load LOAD, a switching transistor Tr1, and a third resistor R3. The positive-temperature-coefficient thermistor PTC is disposed in the vicinity of the switching transistor Tr1 and changes so as to have a resistance value according to the temperature of the switching transistor Tr1. In this case, the temperature detection target by the positive-temperature-coefficient thermistor PTC is the switching transistor Tr1. When the temperature of the switching transistor Tr1 is the Curie point of the positive-temperature-coefficient thermistor PTC or lower, the switching transistor Tr1 is brought into conduction by the positive-temperature-coefficient thermistor PTC having a low resistance value and a current flows to the load LOAD. On the other hand, when the temperature of the switching transistor Tr1 increases due to variations of the current to the load LOAD, etc., the temperature of the positive-temperature-coefficient thermistor PTC reaches the Curie point and exceeds the Curie point, since the resistance of the positive-temperature-coefficient thermistor PTC becomes high, that is, a predetermined value or higher, the base current to the switching transistor Tr1 is reduced by the positive-temperature-coefficient thermistor PTC having a high resistance value, and accordingly, the switching transistor Tr1 is interrupted and the current to the load LOAD is stopped. The detected temperature of the positive-temperature-coefficient thermistor PTC at which the interrupt operation is performed corresponds to an interrupt temperature. In this circuit, since the current to the load stops, the abnormal electrical conduction stops, and accordingly, the temperature of the temperature detection target (switching transistor Tr1, in this case) falls. When the resistance of the positive-temperature-coefficient thermistor PTC becomes lower than a predetermined value as the temperature decreases, since the base current to the switching transistor Tr1 increases beyond a predetermined value, the switching transistor Tr1 returns to the state in which a current flows to the load. The detected temperature of the positive-temperature-coefficient thermistor PTC at which the return operation is performed corresponds to a return temperature. In this circuit, the interrupt temperature is the same as or close to the return temperature.

However, when the temperature of the temperature detection target fluctuates in the vicinity of the interrupt temperature where the resistance of the positive-temperature-coefficient thermistor greatly changes, since the interrupt temperature is the same as or close to the return temperature, there is a risk that the semiconductor switching element alternates between a conductive state and an interrupt state. From the viewpoint of the life of the power supply, etc., it is not desirable that such a conductive state and an interrupt state alternate in a short period of time. Then, if the interrupt temperature and the return temperature can be set such that the interrupt temperature is a predetermined temperature difference higher than the return temperature, alternating between the interrupt operation and the return operation in a short period of time can be avoided. However, in the related overheat protection circuit shown in FIG. 8, such a temperature difference could not be realized.

SUMMARY OF THE INVENTION

In order to overcome the problems described above, preferred embodiments of the present invention provide an overheat protection circuit including a positive-temperature-coefficient thermistor and in which conduction and interruption alternate in a relatively short period of time.

An overheat protection circuit of a preferred embodiment of the present invention includes a semiconductor switching element provided in a current path from a power supply to a load and performing operations of bringing the path into conduction and interrupting the path, and an operating-mode control circuit for controlling the semiconductor switching element in a first operating mode in which a conductive operation is shifted to an interrupt operation when the temperature of a temperature detection portion increases and reaches a predetermined interrupt temperature, and in a second operating mode in which the interrupt operation is shifted to the conductive operation when the temperature of the temperature detection portion decreases and reaches a return temperature which is lower than the interrupt temperature by a predetermined value. In the overheat protection circuit, the operating-mode control circuit includes a first positive-temperature-coefficient thermistor, a second positive-temperature-coefficient thermistor, and a control element, and, using the change in resistance of the first positive-temperature-coefficient thermistor in the first operating mode and the change in resistance of the second positive-temperature-coefficient thermistor in the second operating mode, the operational shift of the semiconductor switching element is controlled by the control element, and each of the first and second operating modes is controlled in the state where both positive-temperature-coefficient thermistors are thermally coupled to the temperature detection portion.

Here, the temperature detection portion is a portion where the temperature is detected in order to protect a designated object from overheating. For example, it is a load or a portion close to the load to which heat is conveyed from the load, a semiconductor switching element which performs the above-described conduction operation and interrupt operation or a portion near the semiconductor switching element to which heat is conveyed from the semiconductor switching element, etc.

According to a preferred embodiment of the present invention, when the temperature of a temperature detection portion increases and reaches a predetermined interrupt temperature, a conductive operation is shifted to an interrupt operation by the change of resistance of a first positive-temperature-coefficient thermistor thermally coupled to the temperature detection portion, and, when the temperature of the temperature detection portion decreases and reaches a predetermined return temperature, which is lower than the interrupt temperature by a predetermined value, the interrupt operation is shifted to the conductive operation by the change of resistance of the second positive-temperature-coefficient thermistor thermally coupled to the temperature detection portion, and accordingly, a prescribed temperature difference is set between the interrupt temperature and the return temperature. Thus, the interrupt state does not return to the conductive state before the temperature of the temperature detection portion becomes as low as the return temperature. Therefore, abnormal overheat can be prevented and a problem in that the conduction and the interruption are repeated in a short period of time can be suppressed. As a result, since the supply of electric power from the power supply to the load can be stabilized and improper burdening the power supply can be eliminated, it becomes possible to make a circuit or device equipped with the overheat protection circuit properly operate.

In preferred embodiments of the present invention, preferably, the control element is a control transistor, the first positive-temperature-coefficient thermistor is connected between the base of the control transistor and the output terminal of the semiconductor switching element, and the second positive-temperature-coefficient thermistor is connected between the base of the control transistor and the input terminal of the semiconductor switching element. In this case, more preferably, the semiconductor switching element is a switching transistor, and the collector of the control transistor is connected to the base of the switching transistor directly or through a current-limiting resistor.

In preferred embodiments of the present invention, preferably the control element is a control transistor, the second positive-temperature-coefficient thermistor is connected between the input terminal and the output terminal of the semiconductor switching element, and the first positive-temperature-coefficient thermistor is connected between the output terminal of the semiconductor switching element and the base of the control transistor. In this case, more preferably the semiconductor switching element is a switching transistor, and the collector of the control transistor is connected to the base of the switching transistor directly or through a current-limiting resistor.

Furthermore, in preferred embodiments of the present invention, a Zener diode is connected to the emitter of the control transistor such that the direction of the polarity of the Zener diode is opposite to the direction of the polarity between the base and emitter of the control transistor.

Furthermore, in preferred embodiments of the present invention, the semiconductor switching element constitutes the temperature detector portion, and both positive-temperature-coefficient thermistors are thermally coupled to the semiconductor switching element.

Other features, elements, characteristics and advantages of the present invention will become more apparent from the following detailed description of preferred embodiments thereof with reference to the attached figures.

DETAILED DESCRIPTION OF PREFERRED EMBODIMENTS

Hereinafter, preferred embodiments of the present invention are described with reference to the accompanying drawings.

Figure 1:
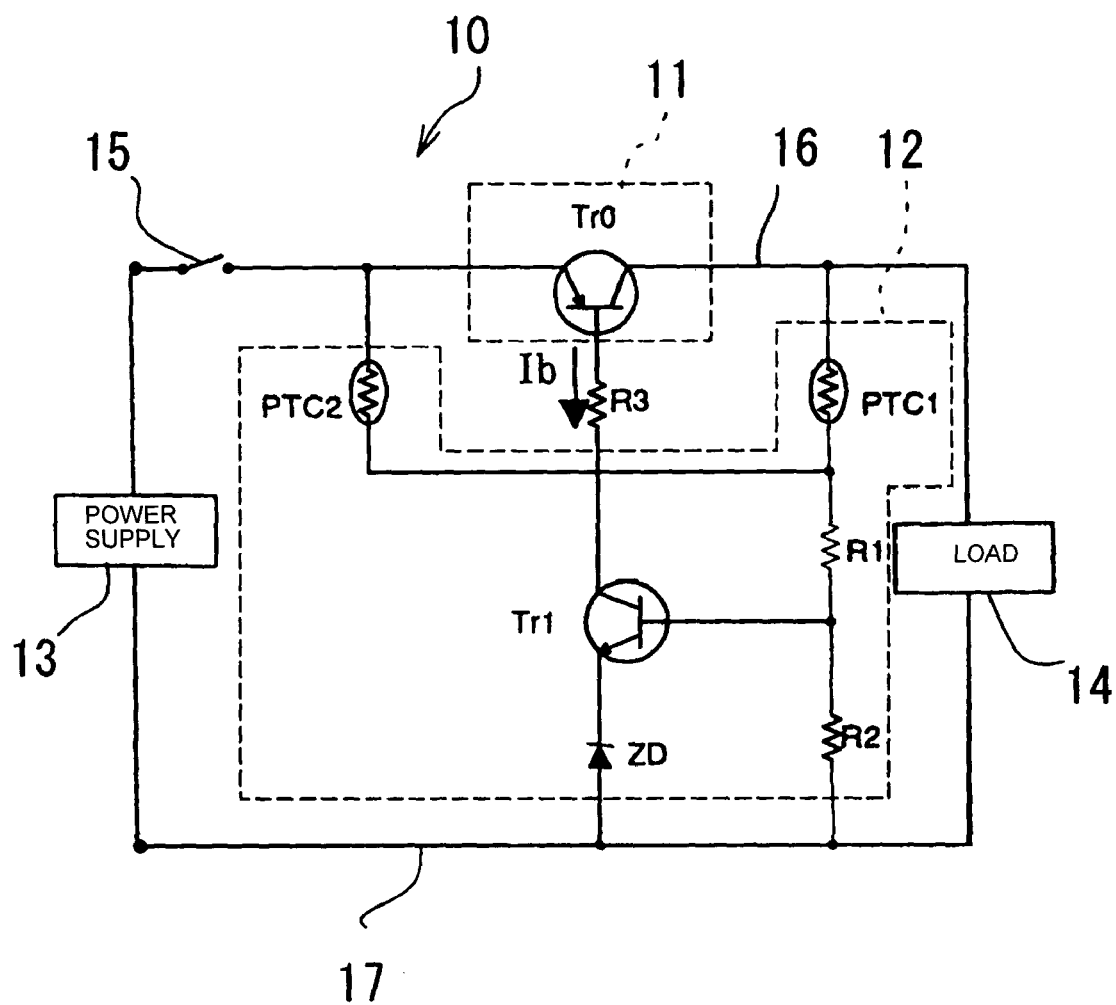
FIG. 1 is a circuit diagram of an overheat protection circuit according to a preferred embodiment of the present invention.
Figure 2A:
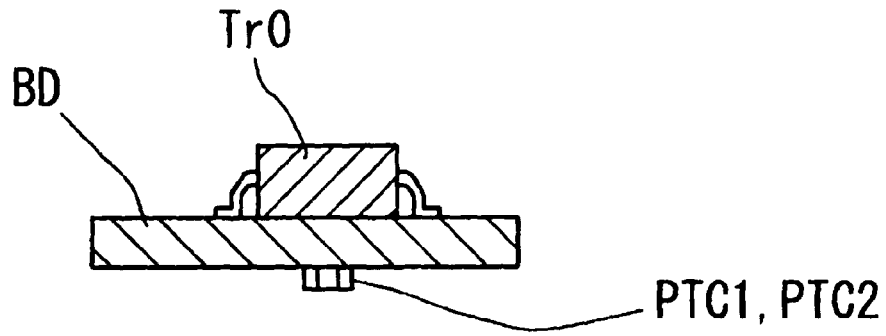
FIG. 2A is a vertical sectional view of one example showing the thermal coupling between a switching transistor and positive-temperature-coefficient thermistors.
Figure 2B:
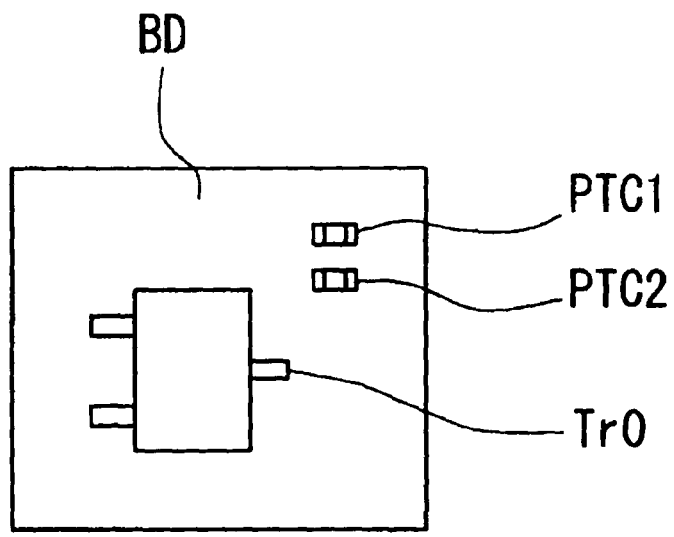
FIG. 2B is a top view of another example showing the thermal coupling between a switching transistor and positive-temperature-coefficient thermistors.
Figure 3:
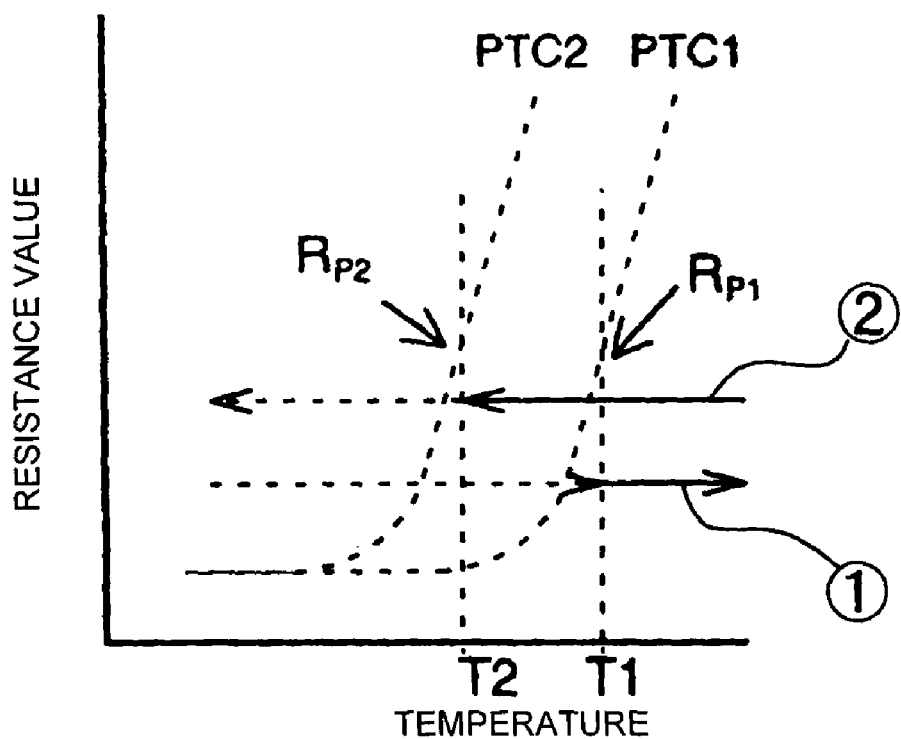
FIG. 3 shows the resistance-versus-temperature characteristics of a first positive-temperature-coefficient thermistor and a second positive-temperature-coefficient thermistor.

FIGS. 1 to 3 show a preferred embodiment of the present invention. FIG. 1 is a circuit diagram of an overheat protection circuit according to a preferred embodiment of the present invention, FIGS. 2A and 2B show the thermal coupling between positive-temperature-coefficient thermistors and the switching transistor in FIG. 1, and FIG. 3 shows resistance-versus-temperature characteristics of the positive-temperature-coefficient thermistors in FIG. 1. In FIG. 1, an overheat protection circuit 10 preferably includes an interrupt circuit 11 and an operating-mode control circuit 12. In FIG. 1, a power supply 13 (DC power supply, for example, a DC—DC converter, battery, etc.), a load 14, and a power switch 15 are shown.

The interrupt circuit 11 includes a switching transistor Tr0 as a semiconductor switching element, which is provided in a current path 16 from the power supply 13 to the load 14 and performs the operations of bringing the path 16 into conduction and interrupting the path 16. That is, the collector and emitter of the switching transistor Tr0 are inserted in series in the path 16. Here, the switching transistor Tr0 is of a bipolar type and the emitter constitutes an input terminal connected to the power supply 13 side, the collector constitutes an output terminal connected to the load 14 side, and the base constitutes a control terminal which brings the collector and emitter into conduction and interrupts the collector and emitter, when control signals from a control transistor Tr1 serving as a control element, which will be described later, are applied.

The operating-mode control circuit 12 includes a first positive-temperature-coefficient thermistor PTC1, a second positive-temperature-coefficient thermistor PTC2, the control transistor Tr1 functioning as a control element, a Zener diode ZD, and a pair of resistors R1 and R2. As shown in FIGS. 2A and 2B, both positive-temperature-coefficient thermistors PTC1 and PTC2 are thermally coupled to the switching transistor Tr0 to constitute a temperature detection portion; the thermistors PTC1 and PTC2 are provided in a portion whose temperature changes according to the temperature of the switching transistor Tr0, thus changing the resistance values of the thermistors PTC1 and PTC2. In the case of FIG. 2A, the switching transistor Tr0 and the positive-temperature-coefficient thermistors PTC1 and PTC2 are provided on the top and bottom surfaces of a printed-circuit board BD, respectively. Both positive-temperature-coefficient thermistors PTC1 and PTC2 are thermally coupled to the switching transistor Tr0 such that the heat generated by the switching transistor Tr0 is conveyed through the printed-circuit board BD to the thermistors PTC1 and PTC2, which are positioned underneath the switching transistor Tr0. In the case of FIG. 2B, the switching transistor Tr0 and the positive-temperature-coefficient thermistors PTC1 and PTC2 are arranged on the same surface of the printed-circuit board BD so as to be close to each other. Both positive-temperature-coefficient thermistors PTC1 and PTC2 are thermally coupled to the switching transistor Tr0 such that the heat generated by the switching transistor Tr0 is conveyed through the printed-circuit board BD to the thermistors PTC1 and PTC2 positioned close to the switching transistor Tr0.

This temperature detection portion is not limited to the vicinity of the switching transistor Tr0, and, for example, when an overheat protection circuit of the present preferred embodiment is provided inside the housing of electronic equipment, any suitable location inside the housing may be used as the temperature detection portion. Furthermore, when an overheat protection circuit of the present preferred embodiment is adopted in a power-supply circuit having an electric motor as a load, the electric motor or its vicinity may be used as the temperature detection portion.

The operating-mode control circuit 12 operates in a first operating mode in which, when the temperature of the substrate near the switching transistor Tr0, functioning as a temperature detection portion, increases due to the heat developed by the switching transistor Tr0 and the positive-temperature-coefficient thermistor reaches an interrupt temperature, for example, about 120° C., the conductive operation is shifted to the interrupt operation, and in a second operating mode in which, when the temperature of the substrate decreases and the positive-temperature-coefficient thermistor reaches a return temperature, for example, about 100° C., the interrupt operation is shifted back to the conductive operation.

In the present preferred embodiment, in order to perform the above-described control operation, the positive-temperature-coefficient thermistors PTC1 and PTC2 have different Curie points from each other and the resistance-versus-temperature characteristic of each of the thermistors PTC1 and PTC2 is described with reference to FIG. 3. In the first positive-temperature-coefficient thermistor PTC1, a resistance value $R_{p1}$ is reached at the interrupt temperature T1 to reduce the base current and turn off the control transistor Tr1, and in the second positive-temperature-coefficient thermistor PTC2, a resistance value $R_{p2}$ is reached at the return temperature T2 to increase the base current and turn on the control transistor Tr1.

The positive-temperature-coefficient thermistors PTC1 and PTC2 are preferably made of ceramics produced such that a very small quantity of rare earth metal is added to barium titanate (BaTiO3) and the mixture is sintered, and show considerably positive resistance-versus-temperature characteristics at the interrupt and return temperatures. The temperature can be set by adjustment of the main component and additives. Among thermistors, there are surface-mounting types, screw types, discrete types, etc., and they are made to function as an overheat protection element by using a characteristic in which the resistance value changes when the surrounding temperature is detected.

The connection of the operating-mode control circuit 12 will be described. The first positive-temperature-coefficient thermistor PTC1 is connected between the collector of the switching transistor Tr0 and the base of the control transistor Tr1 through a bias resistor R1. The second positive-temperature-coefficient thermistor PTC2 is connected between the emitter of the switching transistor Tr0 and the base of the control transistor Tr1 through the bias resistor R1.

The base of the switching transistor Tr0 is connected to the collector of the control transistor Tr1 through a current-limiting resistor R3. The emitter of the control resistor Tr1 is connected to the other path 17 between the power supply 13 and the load 14 through a Zener diode ZD. This Zener diode ZD is connected so as to have a polarity that is opposite to that between the base and emitter of the control transistor Tr1. A bias resistor R2 is connected to the base of the control transistor Tr1.

Moreover, the Zener diode ZD has a function of improving the interrupting characteristic of the base current of the switching transistor Tr0.

Here, the operation is described. When the power switch 15 is closed, since the switching transistor Tr0 is turned off, a current from the power supply 13 does not flow into the first positive-temperature-coefficient thermistor PTC1, but a current is supplied to the base of the control transistor Tr1 through the second positive-temperature-coefficient thermistor PTC2 and the bias resistor R1. Thus, the control transistor Tr1 is brought into conduction. In this case, since the switching transistor Tr0 does not generate heat, the resistance value of the second positive-temperature-coefficient thermistor PTC2 due to the temperature of the switching transistor Tr0 is low. Under such a condition, since the resistance value of the second positive-temperature-coefficient thermistor PTC2 is low, a base current to be determined by the second positive-temperature-coefficient thermistor PTC2 and the resistance values of the bias resistors R1 and R2 flows to the base of the control transistor Tr1 and the control transistor Tr1 is brought into conduction.

When the control transistor Tr1 is made conductive, the base current lb of the switching transistor Tr0 flows for the base side of the control transistor Tr1 through the current limiting resistor R3, and the switching transistor Tr0 is made conductive because of the switching operation. When the switching transistor Tr0 is made conductive, the path 16 is made conductive and, as a result, a current from the power supply 13 is supplied to the load 14. Furthermore, the first positive-temperature-coefficient thermistor PTC1 is also made conductive and a current flows to the base of the control transistor Tr1 from the first positive-temperature-coefficient thermistor PTC1.

When the temperature of the switching transistor Tr0 increases due to variation of the load, although the temperature of the second positive-temperature-coefficient thermistor PTC2 increases and its resistance value rapidly increases to reach $R_{p2}$, since the first positive-temperature-coefficient thermistor PTC1 does not reach $R_{p1}$, the switching transistor Tr1 is not interrupted yet. Then, when the temperature of the switching transistor Tr0 further increases and the first positive-temperature-coefficient thermistor PTC1 reaches the interrupt temperature, the resistance value of the first positive-temperature-coefficient thermistor PTC1 reaches $R_{p1}$, the base current of the control transistor Tr1 is interrupted, and the control transistor Tr1 switches from a conductive state to an interrupt state. When the switching transistor Tr1 is interrupted, in the same way as described above, the switching transistor Tr0 is interrupted. This is the first operating mode. In this way, the switching transistor Tr0 can be prevented from being damaged. Moreover, in FIG. 3, an arrow (1) shows the operating mode in the direction of the arrow, in which the left side of the temperature T1 of the first positive-temperature-coefficient thermistor PTC1 where the resistance value $R_{p1}$ for interrupting the control transistor Tr1 is reached is shown by a broken line, which represents a conductive state, and the right side is shown by a solid line, which represents an interrupt state. Moreover, although the arrow (1) is shown by a solid line which exceeds the temperature T1 for easier understanding, since overheating of the switching transistor Tr0 is prevented, the solid line does not substantially go beyond the temperature T1.

When the switching transistor Tr0 is interrupted, the current in the switching transistor Tr0 stops and the temperature due to self-heating is lowered in the switching transistor Tr0. Furthermore, when the switching transistor Tr0 is interrupted, since the first positive-temperature-coefficient thermistor PTC1 is interrupted, it is required that the temperature of the second positive-temperature-coefficient thermistor PTC2 decreases to T2 and the control transistor Tr1 be made conductive in order to make the switching transistor Tr0 conductive again.

When the temperature of the switching transistor Tr0 decreases, the second positive-temperature-coefficient thermistor PTC2 reaches the return temperature and the resistance value reaches $Rp_2$, a base current flows to the base of the control transistor Tr1, and the control transistor Tr1 is made conductive. Accordingly, the switching transistor Tr0 returns to the conductive state. This is the second operating mode. Moreover, in FIG. 3, an arrow (2) shows the operating mode in the direction of the arrow, in which the right side of the temperature of T2 of the second positive-temperature-coefficient thermistor PTC2 where the resistance value $Rp_2$ for making the control transistor Tr1 conductive is reached is shown by a solid line, which represents an interrupt state, and the left side is shown by a broken line, which represents a conductive state. Moreover, although the arrow (2) is shown by a solid line which exceeds the temperature T2 for easier understanding, since the overheating of the switching transistor Tr0 is prevented, the solid line does not substantially go beyond the temperature T2. The area between T1 and T2 shows the temperature difference between the interrupt and return temperatures.

In this way, according to the present preferred embodiment, since the return temperature where the switching transistor Tr0 is made conductive is set to be sufficiently lower than the interrupt temperature where the switching transistor Tr0 is interrupted when overheated, there are no cases where the interruption and conduction of the switching transistor Tr0 alternates in a relatively short time.

The present invention is not limited to the above-described preferred embodiment and various modifications are possible.

Figure 4:
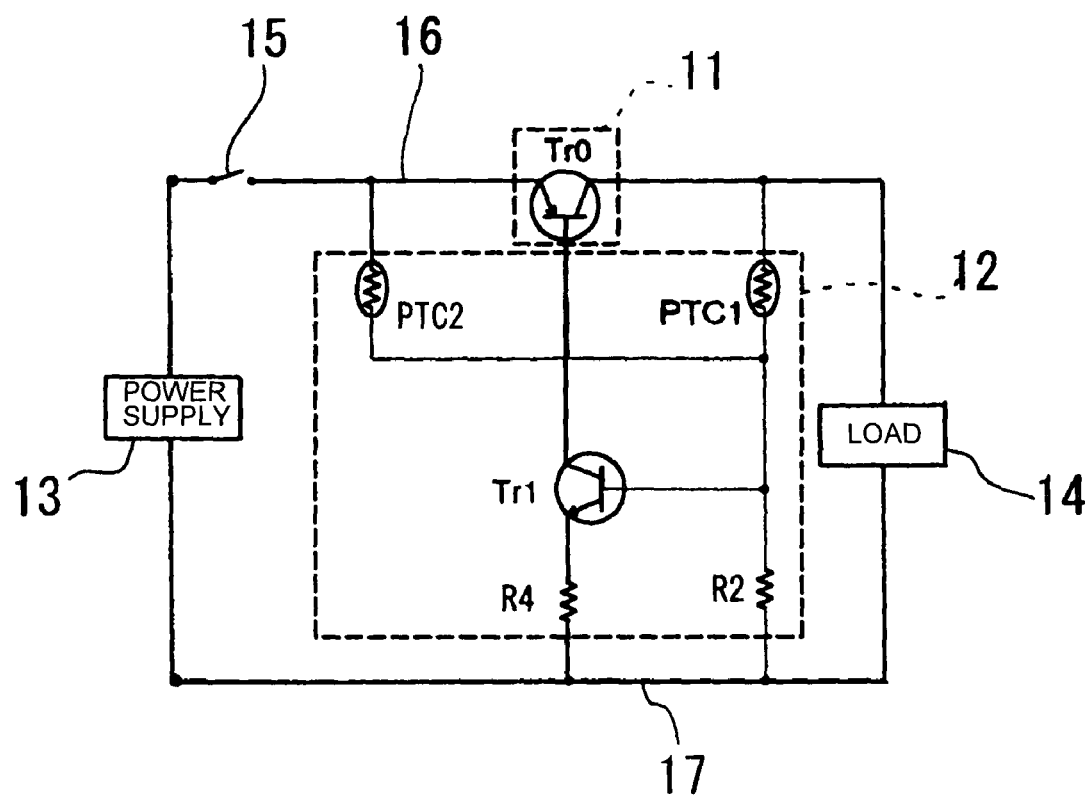
FIG. 4 is a circuit diagram of an overheat protection circuit according to another preferred embodiment of the present invention.

For example, in an overheat protection circuit of a preferred embodiment of the present invention, as shown in FIG. 4, the resistors R1 and R3 may be omitted. Furthermore, a resistor R4 may be provided instead of the Zener diode ZD.

Figure 5:
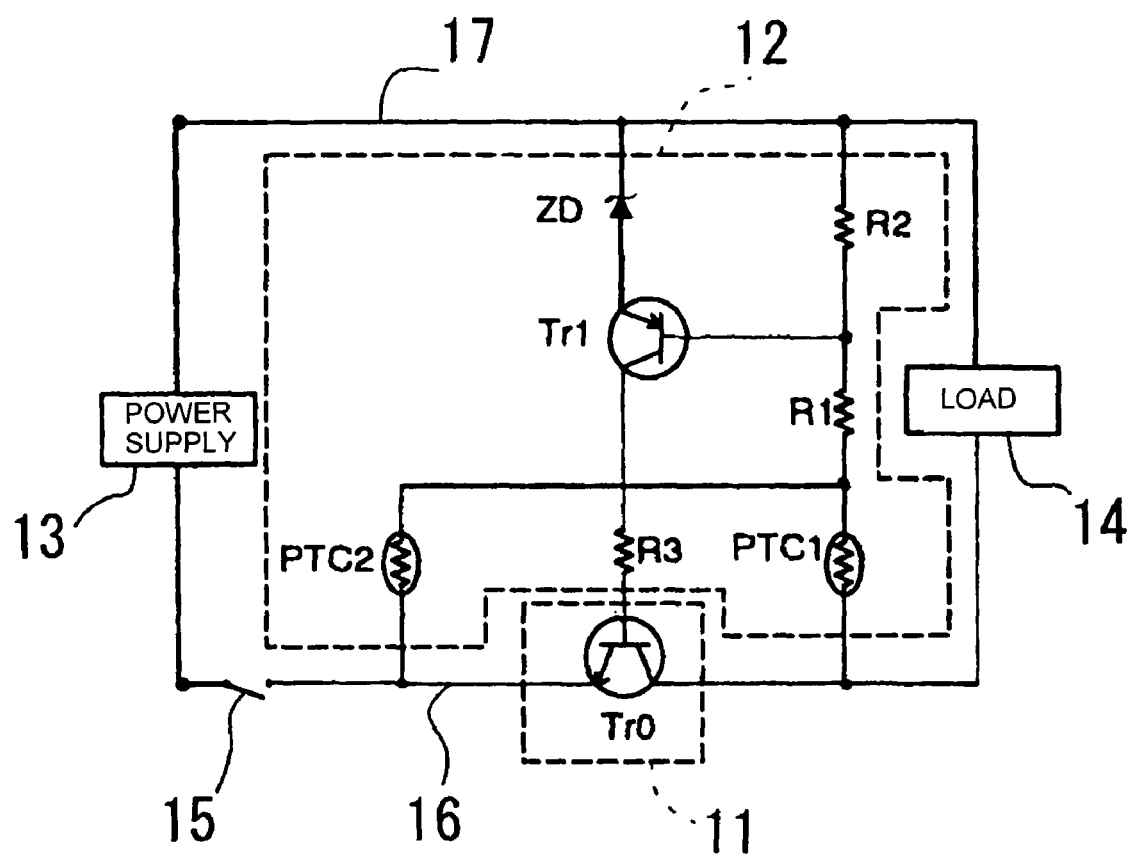
FIG. 5 is a circuit diagram of an overheat protection circuit according to another preferred embodiment of the present invention.

In an overheat protection circuit of another preferred embodiment of the present invention, as shown in FIG. 5, the conductive pattern of the switching transistor Tr0 and the control transistor Tr1 may be changed as a modified circuit construction.

Figure 6:
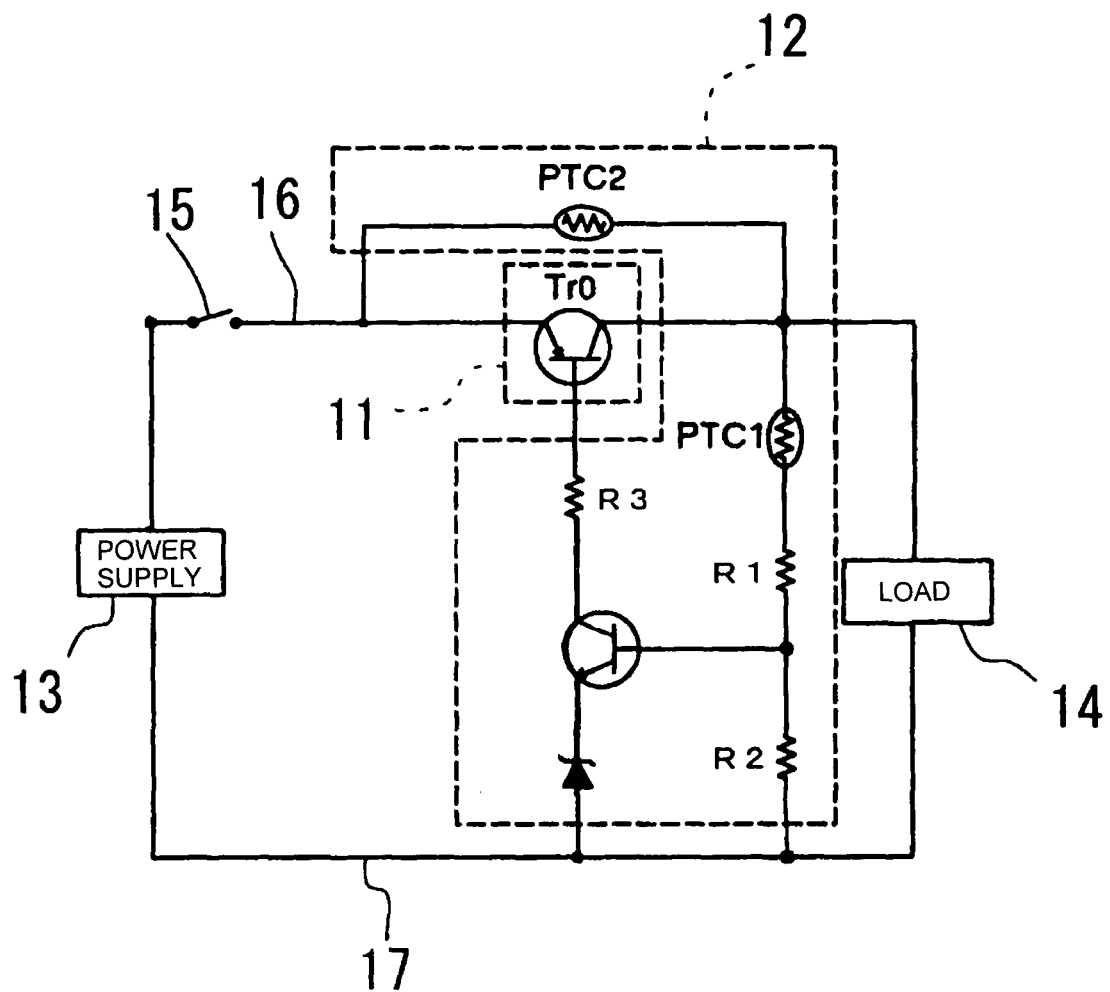
FIG. 6 is a circuit diagram of an overheat protection circuit according to another preferred embodiment of the present invention.
Figure 7:
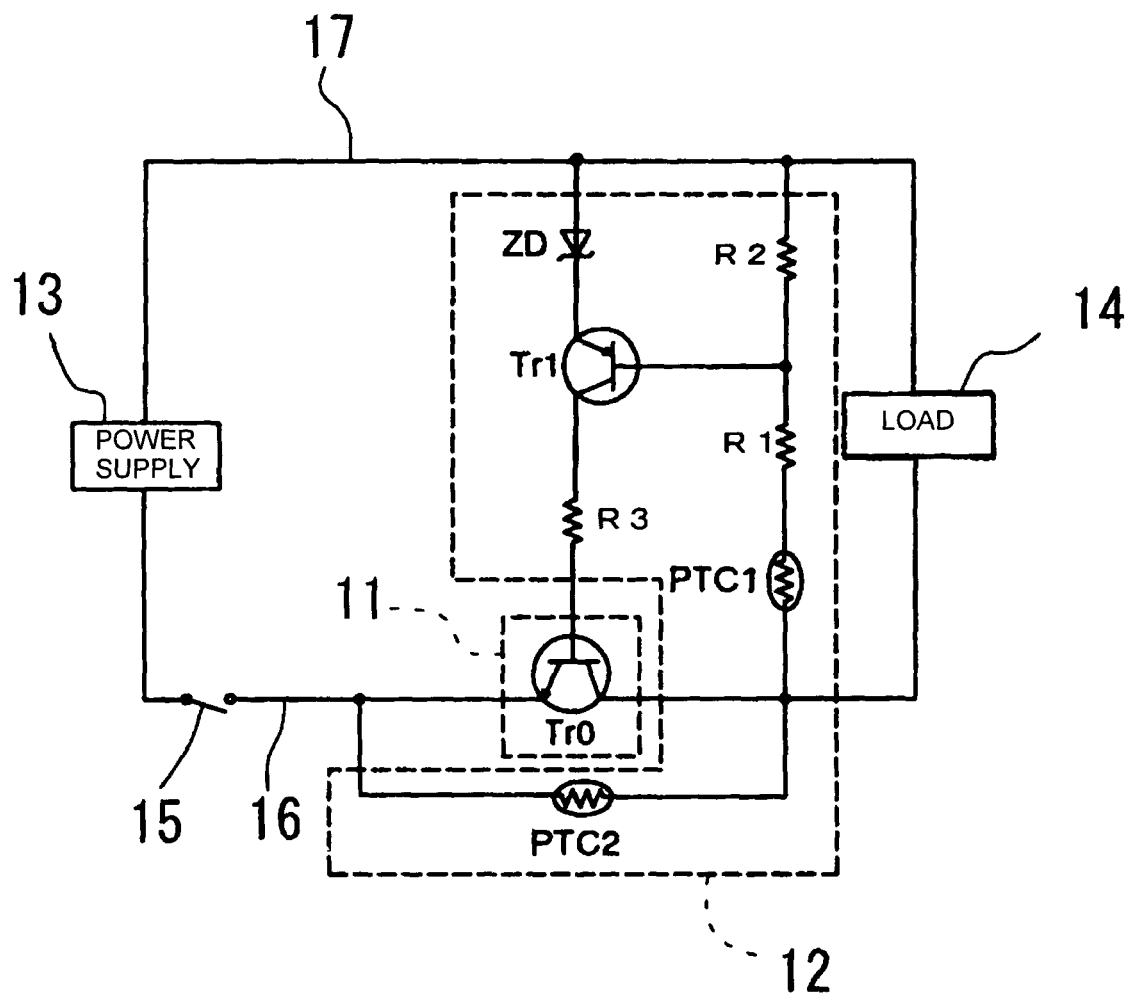
FIG. 7 is a circuit diagram of an overheat protection circuit according to another preferred embodiment of the present invention.
Figure 8:
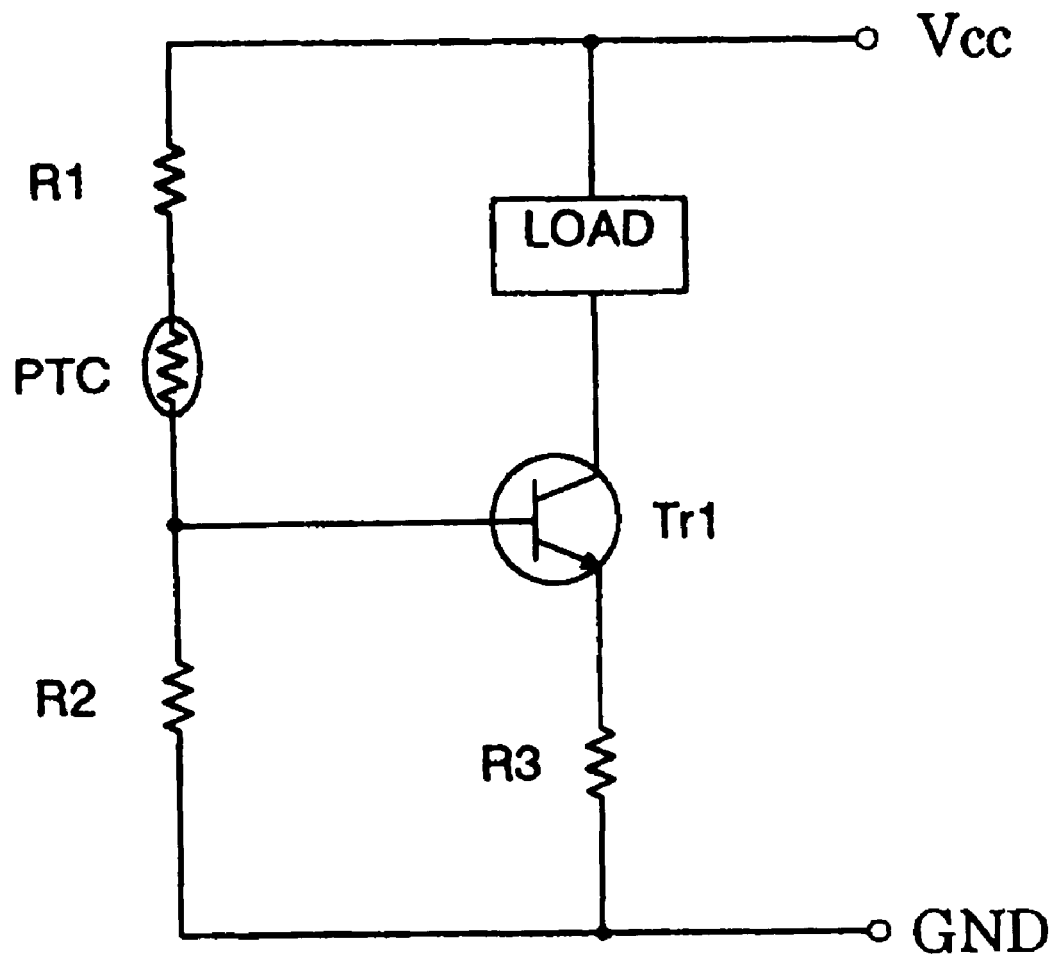
FIG. 8 is a circuit diagram of a related overheat protection circuit.

In an overheat protection circuit of another preferred embodiment of the present invention, a circuit construction shown in FIG. 6 may be used. With reference to FIG. 6, in this overheat protection circuit, the second positive-temperature-coefficient thermistor PTC2 is connected in parallel between the collector and emitter of the switching transistor Tr0. In such a construction, when the power switch 15 is closed, since the resistance value of both positive-temperature-coefficient thermistors is low, the control transistor Tr1 is made conductive and the switching transistor Tr0 is also made conductive. Thus, the second positive-temperature-coefficient thermistor PTC2 is short-circuited and a base current is supplied to the control transistor Tr1 through the first positive-temperature-coefficient thermistor PTC1. Since the switching transistor Tr0 is made conductive, a current is supplied to the load from the power supply 13. When the temperature of the switching transistor Tr0 increases and the temperature of the first positive-temperature-coefficient thermistor PTC1 reaches T1, since the resistance value of both positive-temperature-coefficient thermistors PTC1 and PTC2 become high, the control transistor Tr1 is interrupted. Therefore, according to this, the switching transistor Tr0 is also cut off. In this way, the switching transistor Tr0 is protected from overheating. This is the first operating mode. Then, after the interruption, even if the temperature of the switching transistor Tr0 decreases and the resistance value of the first positive-temperature-coefficient thermistor PTC1 is reduced, since the switching transistor Tr0 is interrupted, the control transistor Tr1 is not made conductive. When the temperature due to self-heating of the switching transistor Tr0 decreases and the temperature of the second positive-temperature-coefficient thermistor PTC2 reaches T2, since the resistance value of the second positive-temperature-coefficient thermistor PTC2 is reduced, a current from the power supply 13 is supplied to the base of the control transistor Tr1. Accordingly, the control transistor Tr1 is made conductive and the switching transistor Tr0 is also made conductive. This is the second operating mode. Eventually, in the overheat protection circuit shown in FIG. 6, in the same way as that in FIG. 1, the alternating between conduction and interruption is prevented in the switching transistor Tr0. Moreover, even if the conductive pattern of the switching transistor Tr0 and the control transistor Tr1 in FIG. 6 is changed as shown in FIG. 7, the same effect can be obtained.

In preferred embodiments of the present invention, any of a bipolar transistor, a MOSFET, or other suitable device can be used as the switching transistor Tr0 and the control transistor Tr1.

As described above, according to various preferred embodiments of the present invention, when the temperature of the temperature detection portion increases and reaches a predetermined interrupt temperature, the shift from a conductive operation to an interrupt operation is performed due to the change in resistance of the first positive-temperature-coefficient thermistor thermally coupled to the temperature detection portion, and, when the temperature of the temperature detection portion decreases and reaches a predetermined return temperature, which is set to be lower than the interrupt temperature, the shift from the interrupt operation to the conductive operation is performed due to the change in resistance of the second positive-temperature-coefficient thermistor thermally coupled to the temperature detection portion. Under such conditions, since a predetermined temperature difference is provided between the interrupt temperature and the return temperature, the switching transistor does not return to the conductive state before the temperature of the temperature detection portion decreases to a temperature which is a predetermined temperature difference lower than the interrupt temperature. Accordingly, abnormal heating can be prevented and the problem of alternating conduction and interruption in a short time can be avoided. As a result, the supply of electric power to a load from the power supply can be stabilized, the load on the power supply can be eliminated, and a circuit or device provided with the overheat protection circuit can be properly operated.

The present invention is not limited to each of the above-described preferred embodiments, and various modifications are possible within the range described in the claims. An embodiment obtained by appropriately combining technical means disclosed in each of the different preferred embodiments is included in the technical scope of the present invention.

What is claimed is:

1. An overheat protection circuit comprising:
   a semiconductor switching element provided in a current path from a power supply to a load and performing operations of bringing the current path into conduction and interrupting the current path; and
   an operating-mode control circuit for controlling the semiconductor switching element in a first operating mode in which a conductive operation is shifted to an interrupt operation when the temperature of a temperature detection portion increases and reaches a predetermined interrupt temperature, and in a second operating mode in which the interrupt operation is shifted to the conductive operation when the temperature of the temperature detection portion decreases and reaches a return temperature which is lower than the interrupt temperature by a predetermined value; wherein
   the operating-mode control circuit includes a first positive-temperature-coefficient thermistor, a second positive-temperature-coefficient thermistor, and a control element, and using a change in resistance of the first positive-temperature-coefficient thermistor in the first operating mode and a change in resistance of the second positive-temperature-coefficient thermistor in the second operating mode, the operational shift of the semiconductor switching element is controlled by the control element, and each of the first and second operating modes is controlled in the state where both positive-temperature-coefficient thermistors are thermally coupled to the temperature detection portion.

2. An overheat protection circuit as claimed in claim 1, wherein the control element is a control transistor, the first positive-temperature-coefficient thermistor is connected between the base of the control transistor and the output terminal of the semiconductor switching element, and the second positive-temperature-coefficient thermistor is connected between the base of the control transistor and the input terminal of the semiconductor switching element.

3. An overheat protection circuit as claimed in claim 2, wherein the semiconductor switching element is a switching transistor and wherein the collector of the control transistor is connected to the base of the switching transistor directly or through a current-limiting resistor.

4. An overheat protection circuit as claimed in claim 1, wherein the control element is a control transistor, the second positive-temperature-coefficient thermistor is connected between the input terminal and the output terminal of the semiconductor switching element, and the first positive-temperature-coefficient thermistor is connected between the output terminal of the semiconductor switching element and the base of the control transistor.

5. An overheat protection circuit as claimed in claim 4, wherein the semiconductor switching element is a switching transistor and the collector of the control transistor is connected to the base of the switching transistor directly or through a current-limiting resistor.

6. An overheat protection circuit as claimed in claim 2, wherein a Zener diode is connected to the emitter of the control transistor such that the direction of polarity of the Zener diode is opposite to the direction of polarity between the base and emitter of the control transistor.

7. An overheat protection circuit as claimed in claim 1, wherein the semiconductor switching element constitutes the temperature detector portion and wherein both positive-temperature-coefficient thermistors are thermally coupled to the semiconductor switching element.

8. An overheat protection circuit as claimed in claim 1, wherein the semiconductor switching element defines an interrupt circuit.

9. An overheat protection circuit as claimed in claim 1, wherein a collector and an emitter of the semiconductor switching element are inserted in series in the current path.

10. An overheat protection circuit as claimed in claim 1, wherein the operating-mode control circuit includes a Zener diode and a pair of resistors.

11. An overheat protection circuit as claimed in claim 1, wherein the first and second positive-temperature-coefficient thermistors are thermally coupled to the semiconductor switching element to constitute the temperature detection portion.

12. An overheat protection circuit as claimed in claim 1, wherein the first and second positive-temperature-coefficient thermistors have different Curie points from each other.

13. An overheat protection circuit as claimed in claim 1, wherein the first and second positive-temperature-coefficient thermistors are connected to the semiconductor switching element via resistors.

14. An overheat protection circuit as claimed in claim 1, wherein the second positive-temperature-coefficient thermistor is connected in parallel between the collector and emitter of the semiconductor switching element.

15. An overheat protection circuit as claimed in claim 1, wherein the semiconductor switching element comprises one of a bipolar transistor and a MOSFET.

* * * * *